US008248192B2

(12) United States Patent
Hu et al.

(10) Patent No.: US 8,248,192 B2

(45) Date of Patent: Aug. 21, 2012

(54) PULSE ACTIVATED MAGNETIC TRIP/RESET MECHANISM FOR A GROUND FAULT CIRCUIT INTERRUPTER

(75) Inventors: Juhai Hu, Yueqing (CN); Yulin Zhang, Yueqing (CN); Bin Liu, Yueqing (CN); Jianning Jiang, Yueqing (CN)

(73) Assignee: General Protecht Group, Inc., Yueqing (CN)

( * ) Notice: Subject to any disclaimer, the term of this patent is extended or adjusted under 35 U.S.C. 154(b) by 216 days.

(21) Appl. No.: 12/685,132

(22) Filed: Jan. 11, 2010

(65) Prior Publication Data

US 2011/0169593 A1 Jul. 14, 2011

(51) Int. Cl.

| | |
|---|---|
| ***H01H 75/00*** | (2006.01) |
| ***H01H 73/12*** | (2006.01) |
| ***H01H 73/00*** | (2006.01) |
| ***H01H 83/06*** | (2006.01) |
| ***H02H 3/00*** | (2006.01) |
| ***H02H 9/08*** | (2006.01) |

(52) U.S. Cl. ............................... 335/18; 361/42; 361/49

(58) Field of Classification Search .................... 335/18; 361/42–51

See application file for complete search history.

(56) References Cited

U.S. PATENT DOCUMENTS

| | | | | |
|---|---|---|---|---|
| 3,091,725 | A * | 5/1963 | Huston | 335/230 |
| 3,718,875 | A * | 2/1973 | Kussy et al. | 335/18 |
| 4,675,776 | A * | 6/1987 | Howell | 361/92 |
| 4,709,293 | A * | 11/1987 | Gershen et al. | 361/50 |
| 5,105,326 | A * | 4/1992 | Shimp et al. | 361/49 |
| 5,724,014 | A * | 3/1998 | Leikus et al. | 335/4 |
| 7,525,402 | B2 * | 4/2009 | Gao | 335/18 |
| 2004/0070897 | A1 * | 4/2004 | Wu et al. | 361/42 |

FOREIGN PATENT DOCUMENTS

DE 102007049448 A1 * 4/2009

* cited by examiner

*Primary Examiner* — Mohamad Musleh

(74) *Attorney, Agent, or Firm* — Morris Manning & Martin LLP; Tim Tingkang Xia, Esq.

(57) ABSTRACT

A pulse activated magnetic trip/reset mechanism for a ground fault circuit interrupter, comprising: (i) a body, (ii) a ferrite core, (iii) a plunger, (iv) a ferrite surrounding, (v) a permanent magnet, (vi) a trip/reset coil, (vii) a reset spring positioned between a plunger block and the body, (viii) a first fixed contact holder having a first fixed contact point, and (ix) a first movable contact holder having a first movable contact point, wherein the first movable contact holder is attached to the body of the plunger such that when the plunger is in its first position (trip position), the first movable contact point is not in contact with the first fixed contact point, and when the plunger is in its second position (reset position), the first movable contact point is in contact with the first fixed contact point.

10 Claims, 5 Drawing Sheets

PULSE ACTIVATED MAGNETIC TRIP/RESET MECHANISM FOR A GROUND FAULT CIRCUIT INTERRUPTER

FIELD OF THE PRESENT INVENTION

The present invention generally relates to a ground fault circuit interrupter (hereinafter after GFCI). More particularly, the present invention relates to a pulse activated magnetic trip/reset mechanism for the ground fault circuit interrupter.

BACKGROUND OF THE PRESENT INVENTION

As the awareness of product safety and demands for higher performance and safer appliances, electrical/electronic products, manufacturer of various appliances, power suppliers, power connectors, and wall outlets are looking for new ways to improve the safety of these products. Products such as surge protectors, leakage current detection interrupters (herein after "LCDI"), and ground fault circuit interrupters (GFCI) are widely used. These products protect against current-surge protection, voltage-surge protection, leakage current protection and ground fault protection. However, the current structure of a GFCI includes at least one trip circuit and one reset circuit, each of these circuits has its own circuit, components, and trip or reset coil. In order to further reduce the cost, the number of components, to reduce the size, and to reduce the cost for assembling the GFCI, it is desirable to simplify the circuit and use only one set circuit to accomplish the tasks of both trip circuit and reset circuit.

Therefore, a heretofore unaddressed need exists in the art to address the aforementioned deficiencies and inadequacies.

SUMMARY OF THE PRESENT INVENTION

In one aspect, the present invention relates to a pulse activated magnetic trip/reset mechanism for a ground fault circuit interrupter. In one embodiment, the pulse activated magnetic trip/reset mechanism has: (i) a body having a top surface, an opposite, bottom surface, a cylindrical opening at the center, (ii) a ferrite core having a concave top surface, and convex bottom surface, (iii) a plunger having a corresponding convex shape matching the concave top surface of the ferrite core, (iv) a ferrite surrounding magnetically coupled with the ferrite core and the plunger to form a complete magnetic field loop, (v) a permanent magnet positioned under the top surface of the body, around and outside of the cylindrical opening of the body, (vi) a trip/reset coil positioned at the bottom portion of the body and around the cylindrical opening of the body, (vii) a reset spring positioned between a plunger block and the top surface of the body to keep the plunger in its reset position, (viii) a first fixed contact holder having a first fixed contact point; and (ix) a first movable contact holder having a first movable contact point.

In one embodiment, the ferrite core is positioned inside of the cylindrical opening at the bottom of the body. In one embodiment, the plunger is positioned above the ferrite core in the cylindrical opening of the body. The plunger can be moved to two positions in reaction to magnetic field surrounding the plunger: (1) a first position (trip position) where the plunger is in close contact with the ferrite core, and (2) a second position (reset position) where the plunger is away from the ferrite core.

In one embodiment, when a series of pulses in a first polarity pass through the trip/reset coil, the magnetic field generated by the trip/reset coil drives the plunger to the first position, and when a series of pulses in a second polarity that is opposite to the first polarity pass through the trip/reset coil, the magnetic field generated by the trip/reset coil drives the plunger to the second position.

In one embodiment, the first movable contact holder is attached to the body of the plunger such that when the plunger is in its first position (trip position), the first movable contact point is not in contact with the first fixed contact point, and when the plunger is in its second position (reset position), the first movable contact point is in contact with the first fixed contact point.

In one embodiment, the pulse activated magnetic trip/reset mechanism also has: (i) a second fixed contact holder having a second fixed contact point; and (ii) a second movable contact holder having a second movable contact point. The second movable contact holder is also attached to the body of the plunger such that when the plunger is in its first position (trip position), the second movable contact point is not in contact with the second fixed contact point, and when the plunger is in its second position (reset position), the second movable contact point is in contact with the second fixed contact point.

In one embodiment, the first polarity of the series pulses is positive, and the second polarity of the series pulses is negative.

In one embodiment, the present invention relates to a ground fault circuit interrupter with the pulse activated magnetic trip/reset mechanism.

In another aspect, the present invention relates to an electronic circuit for a pulse activated magnetic trip/reset mechanism of a ground fault circuit interrupter. In one embodiment, the electronic circuit for a pulse activated magnetic trip/reset mechanism has:

(i) a first input of an alternate current;

(ii) a second input of the alternate current;

(iii) a diode having an anode and a cathode;

(iv) a reset switch having a first terminal and a second terminal;

(v) a resistor having a first terminal and a second terminal, (vi) a trip/reset coil having a first terminal and a second terminal;

(vii) a capacitor having a positive terminal and a negative terminal; and (viii) a silicon controlled rectifier having an anode, a cathode and a gate.

In one embodiment, the anode of the first diode is electrically coupled to the first input of the alternate current. The cathode of the first diode is electrically coupled to the first terminal of the reset switch and the first terminal of the resistor. The first terminal of the trip/reset coil is electrically coupled to the second terminal of the reset switch and the anode of the silicon controlled rectifier, and the second terminal of the trip/reset coil is electrically coupled to the second terminal of the resistor and the positive terminal of the capacitor. The positive terminal of the capacitor is electrically coupled to the second terminal of the resistor and the second terminal of the trip/reset coil, and the negative terminal of the capacitor is electrically coupled to the second input of the alternate current. The anode of the silicon controlled rectifier is electrically coupled to the first terminal of the trip/reset coil and the second terminal of the reset switch, the cathode of the silicon controlled rectifier is electrically coupled to the second input of the alternate current and the negative terminal of the capacitor, and the gate of the silicon controlled rectifier is electrically coupled to a control signal from a ground fault detection circuit.

When the ground fault detection circuit provides a positive control signal if a ground fault is detected, the silicon controlled rectifier becomes conductive and a series of pulses in a first polarity pass through the first input of the alternate current, the diode, the resistor, from the second terminal to the first terminal of the trip/reset coil, the silicon controlled rectifier and the second input of the alternate current to cause the trip/reset coil to be in trip position. When the trip/reset coil is in trip position and the reset switch is pressed, a series pulses in a second (opposite to the first) polarity pass through the trip/reset coil in an opposite direction, from the first terminal to the second terminal of the trip/reset coil, to cause the trip/reset coil to be in reset position.

In one embodiment, the present invention relates to a ground fault circuit interrupter with the electronic circuit for a pulse activated magnetic trip/reset mechanism.

In yet another aspect the present invention relates to an electronic circuit for a pulse activated magnetic trip/reset mechanism of a ground fault circuit interrupter. The electronic circuit for a pulse activated magnetic trip/reset mechanism has:

(i) a first input of an alternate current;

(ii) a second input of the alternate current;

(iii) a first diode having an anode and a cathode;

(iv) a reset switch having a first terminal and a second terminal;

(v) a trip/reset coil having a first terminal and a second terminal;

(vi) a second diode having an anode and a cathode; and (vii) a silicon controlled rectifier having an anode, a cathode and a gate.

In one embodiment, the anode of the first diode is electrically coupled to the second input of the alternate current, and the cathode of the first diode is electrically coupled to the first terminal of the reset switch. The first terminal of the reset switch is electrically coupled to the cathode of the first diode, and the second terminal of the reset switch is electrically coupled to the second terminal of the trip/reset coil and the anode of the second diode. The first terminal of the trip/reset coil is electrically coupled to the first input of the alternate current, and the second terminal of the trip/reset coil is electrically coupled to the second terminal of the reset switch and the anode of the second diode. The anode of the second diode is electrically coupled to the second terminal of the reset switch and the second terminal of the trip/reset coil, and the cathode of the second diode is electrically coupled to the anode of the silicon controlled rectifier. The anode of the silicon controlled rectifier is electrically coupled to the cathode of the second diode, the cathode of the silicon controlled rectifier is electrically coupled to the second input of the alternate current and the anode of the first diode, and the gate of the silicon controlled rectifier is electrically coupled to a control signal from a ground fault detection circuit.

When the ground fault detection circuit provides a positive control signal if a ground fault is detected, the silicon controlled rectifier becomes conductive and a series of pulses in a first polarity pass through the first input of the alternate current, from the first terminal to the second terminal of the trip/reset coil, the second diode, the silicon controlled rectifier and the second input of the alternate current to cause the trip/reset coil to be in trip position. When the trip/reset coil is in trip position and the reset switch is pressed, a series pulses in a second (opposite to the first) polarity pass through the trip/reset coil in an opposite direction, from the second terminal to the first terminal of the trip/reset coil, to cause the trip/reset coil to be in reset position.

In one embodiment, the present invention relates to a ground fault circuit interrupter with the electronic circuit for a pulse activated magnetic trip/reset mechanism.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein.

DETAILED DESCRIPTION OF THE PRESENT INVENTION

Figure 1:
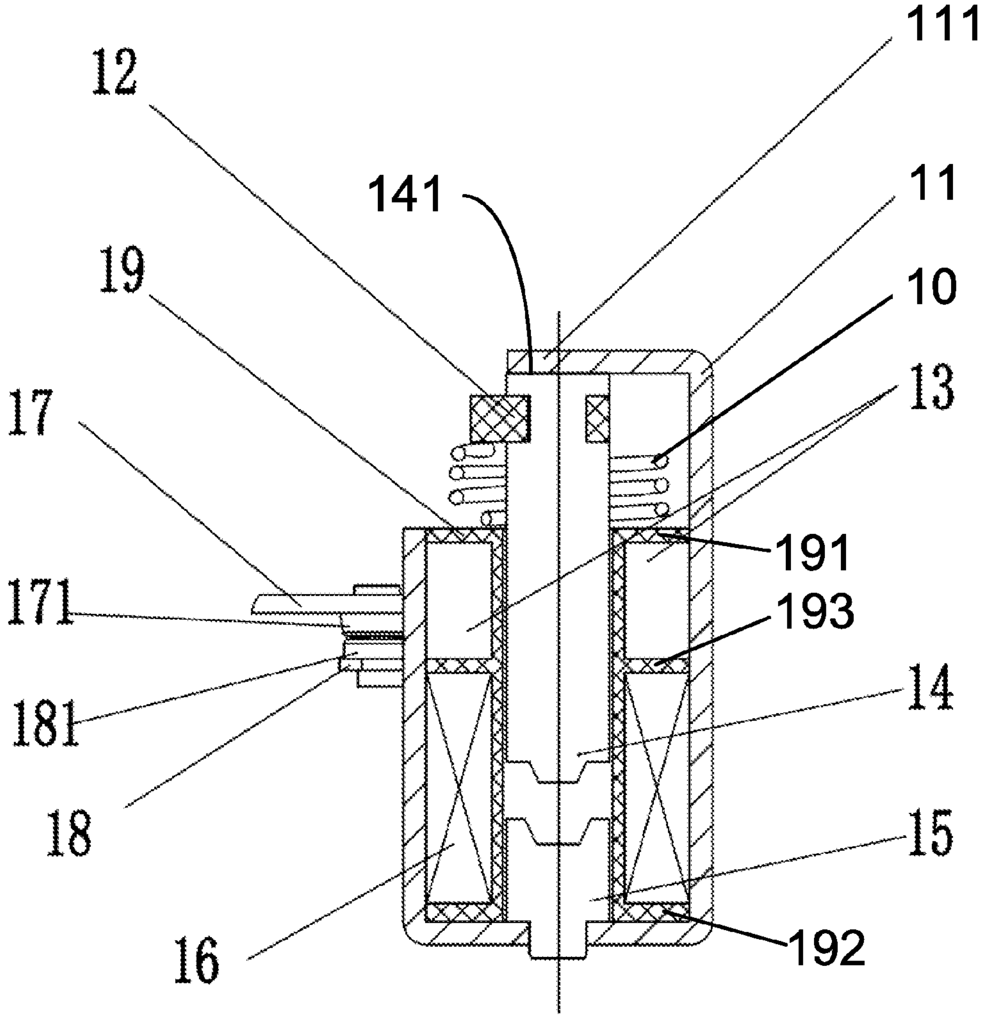
FIG. 1 shows an exemplary sectional view of a GFCI with a pulse activated magnetic trip/reset mechanism showing a movable contact point is contacting a corresponding fixed contact point according to one embodiment of the present invention.

Prior to a detailed description of the present invention(s), the following definitions are provided as an aid to understanding the subject matter and terminology of aspects of the present invention(s), and not necessarily limiting of the present invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended. The terms "unit" and "circuit" are interchangeable.

A switching device usually can be in two states: a conductive state and a non-conductive state. When the switching device is in conductive state, a current is allowed to pass through. When the switching device is in non-conductive state, no current is allowed to pass through.

DEFINITIONS/GLOSSARY

AC: alternate current
GFCI: ground fault circuit interrupter.
SCR: Silicon Controlled Rectifier.

System Overview

The description will be made as to the embodiments of the present invention in conjunction with the reference to the accompanying drawings in FIGS. 1-6. In accordance with the purposes of this invention, as embodied and broadly described herein, this invention, in one aspect, relates to a GFCI with a pulse activated magnetic trip/reset mechanism.

Mechanical Structure of a Pulse Activated Magnetic Trip/Reset Mechanism

Referring now to FIGS. 1, 2, 5 and 6, the mechanical structure of a pulse activated magnetic trip/reset mechanism for a ground fault circuit interrupter is shown according one embodiment of the present invention. The pulse activated magnetic trip/reset mechanism has:

(i) a body 19;
(ii) a ferrite core 15;
(iii) a plunger 14;
(iv) a ferrite surrounding 11;
(v) a permanent magnet 13;
(vi) a trip/reset coil 16;
(vii) a reset spring 10;
(viii) a plunger block 12;
(ix) a first fixed contact holder 17; and
(x) a first movable contact holder 18.

In one embodiment, the body 19 is in a round shape with a top surface 191, an opposite, bottom surface 192, and a central separator 193. A cylindrical opening in the center of the body 19 goes from the top surface 191 through the bottom surface 192. Inside the cylindrical opening of the body 19, the ferrite core 15 and the plunger 14 are positioned, normally having a gap between the ferrite core 15 and the plunger 14. The ferrite core 15 has a concave top surface, and convex bottom surface, positioned inside of the cylindrical opening at the bottom of the body 19. The plunger 14 has a corresponding convex shape matching the concave top surface of the ferrite core 15, and the plunger 14 is positioned above the ferrite core 15 in the cylindrical opening of the body 19.

With the action of the magnetic field generated by the permanent magnet 13 and the trip/reset coil 16, the plunger 14 can be moved up and down. With the position limiting plunger block 12, and the ferrite core 15, the plunger 14 can be placed in two positions: (1) a first (trip) position where the plunger 14 moves down and the convex shape of the plunger 14 is in contact with the corresponding the concave top surface of the ferrite core 15 at the magnetic force generated by a series of pulses in a first polarity pass through the trip/reset coil 16, (2) a second (reset) position where the plunger 14 moves up at the resilient force of the reset spring 10 pushing the plunger block 12 and plunger 14 up and the magnetic force generated by a series of pulses in a second (opposite of the first polarity) pass through the trip/reset coil 16, such that the convex shape of the plunger 14 is away from the corresponding the concave top surface of the ferrite core 15.

Figure 5:
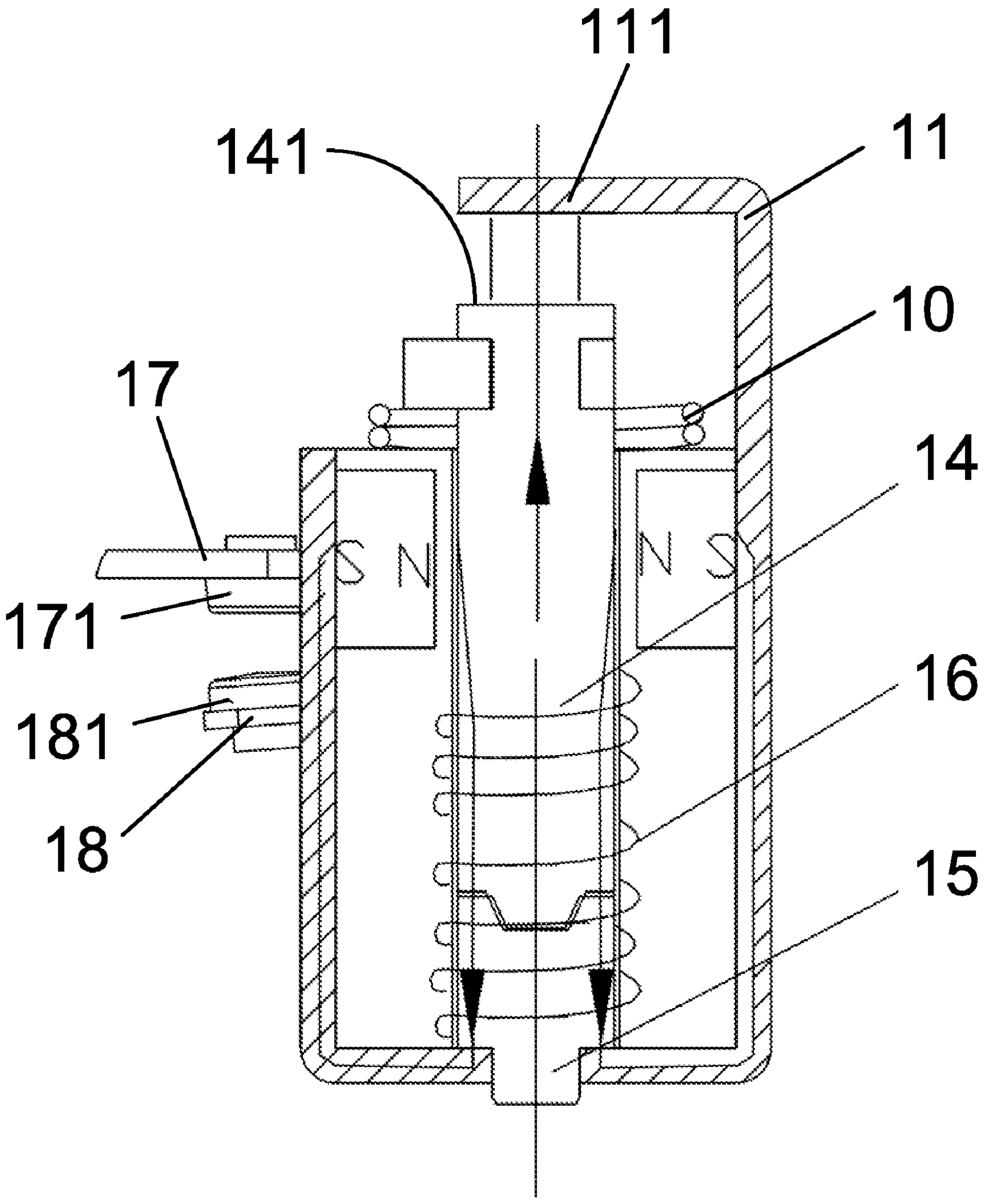
FIG. 5 illustrate cross-sectional views of exemplary pulse activated magnetic trip/reset mechanism showing a movable contact point is not contacting a corresponding fixed contact point according to one embodiment of the present invention.
Figure 6:
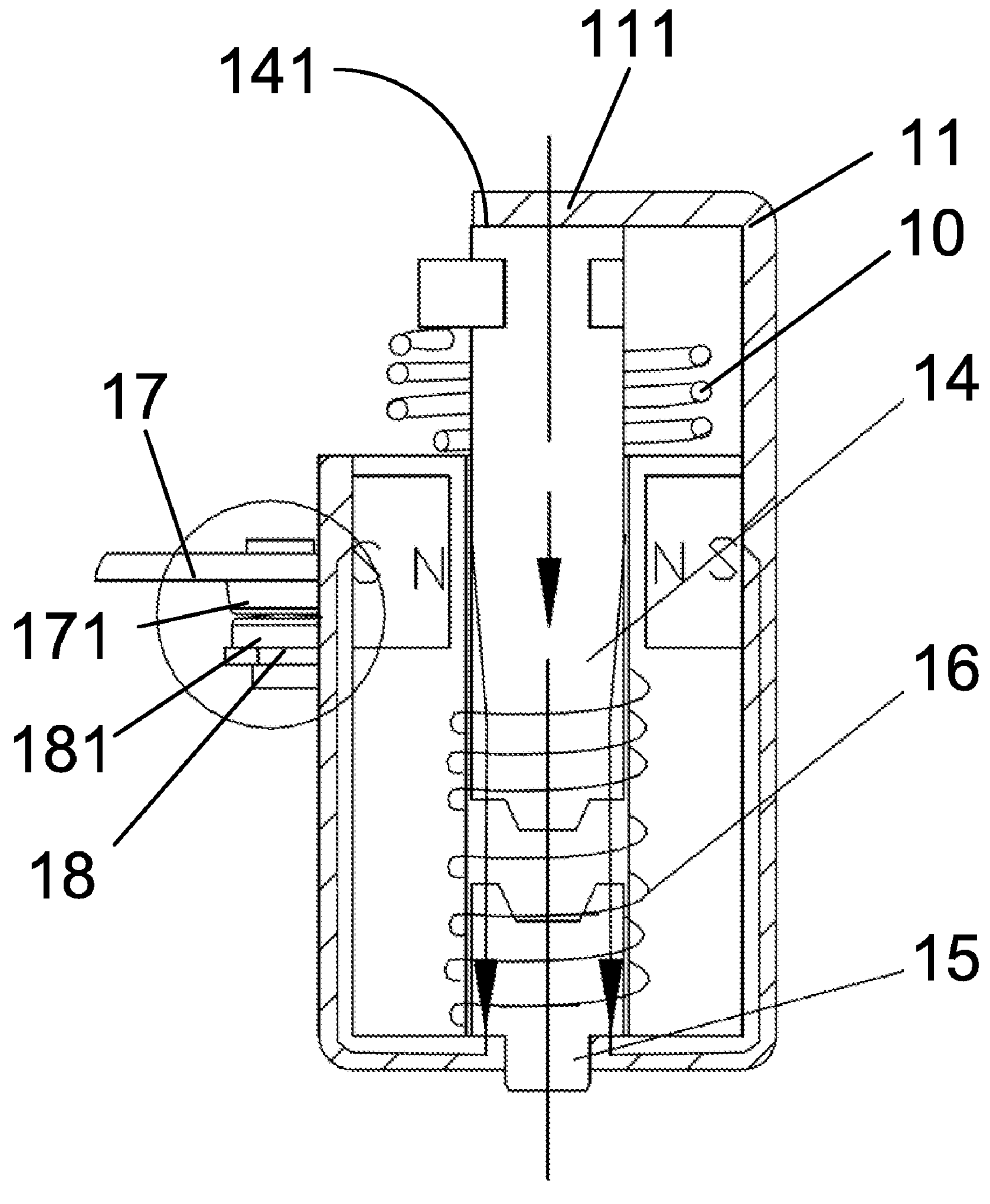
FIG. 6 illustrate cross-sectional views of exemplary pulse activated magnetic trip/reset mechanism showing a movable contact point is contacting a fixed contact point according to one embodiment of the present invention.

The ferrite surrounding 11 surrounds the outer perimeter of the body 19 to magnetically coupled with the ferrite core 15 and the plunger 14 to form a complete magnetic field loop. As shown in FIGS. 1, 5 and 6, the ferrite surrounding 11 is formed of a single ferrite plate. The body 19, the ferrite core 15 and the plunger 14 positioned in the cylindrical opening of the body, and the reset spring 10 are received in the ferrite surrounding 11. As such, when the plunger 14 is in its first position (trip position), the top surface 141 of the plunger 14 is away from a top end portion 111 of the ferrite surrounding 11, as shown in FIG. 5, and when the plunger 14 is in its second position (reset position), the top surface 141 of the plunger 14 is in contact with the top end portion 111 of the ferrite surrounding 11, as shown in FIGS. 1 and 6.

The trip/reset coil 16 is wound outside of the lower portion of the body 19 between the central separator 193 of the body 19 and the bottom surface 192 of the body 19 in such a way that when the series of pulses in the first polarity pass through the trip/reset coil 16, the magnetic force of the trip/reset coil 16 pulls the plunger 14 downward to its first (trip) position, and when the series of pulses in the second polarity pass through the trip/reset coil 16, the magnetic force of the trip/reset coil 16 pushes the plunger 14 upward to its second (reset) position.

The permanent magnet 13 is positioned around the upper portion of the body 19 between the center separator 193 and the top surface 191 of the body 19. The north pole of the permanent magnet 13 is pointing towards the center of the body 19 and the south pole of the permanent magnet 13 is pointing outward away from the center opening of the body 19.

Figure 2:
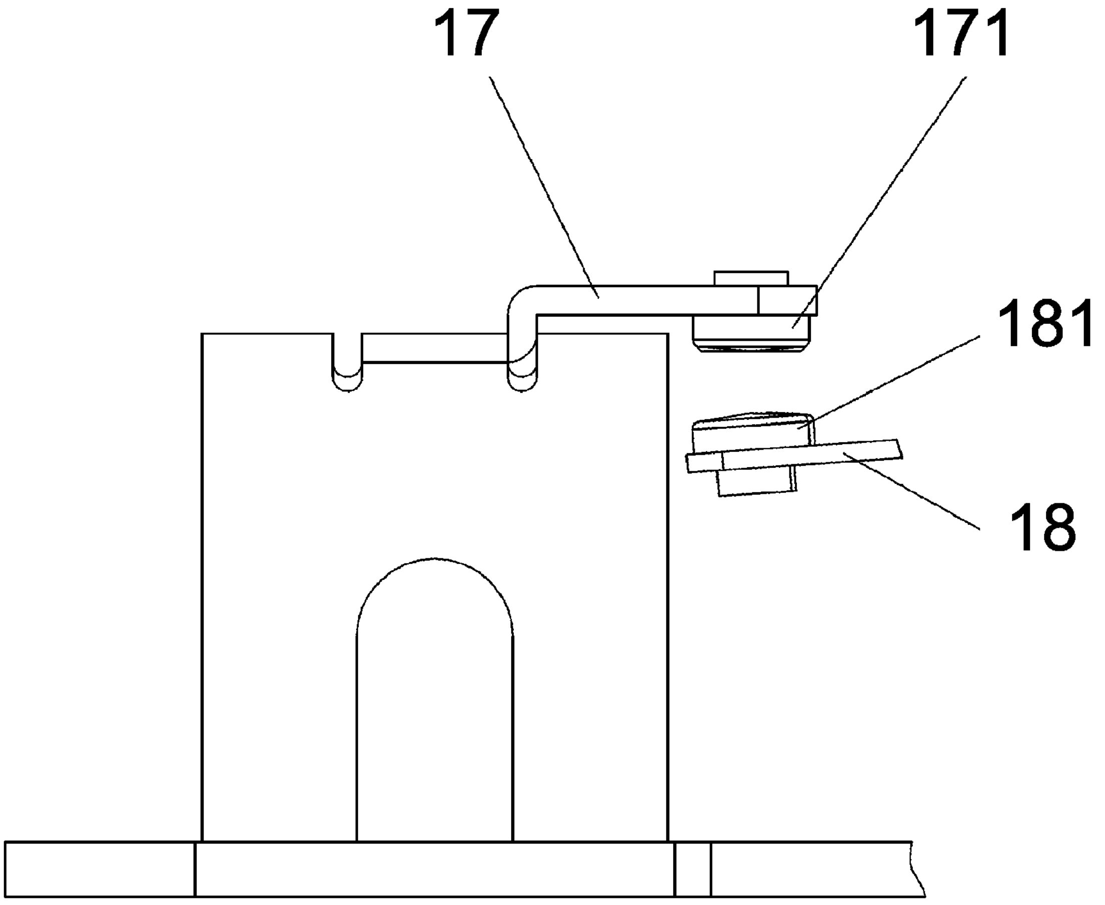
FIG. 2 shows a partial exploded view of more detailed key components of a GFCI with a pulse activated magnetic trip/reset mechanism while the movable contact point is not contacting the fixed contact point according to one embodiment of the present invention.

Referring FIGS. 1 and 2, in one embodiment, the first fixed contact holder 17 has a first fixed contact point 171; and the first movable contact holder 18 has a first movable contact point 181. In one embodiment, the pulse activated magnetic trip/reset mechanism has another set of fixed and movable contact holders: a second fixed contact holder 27 and a second movable contact holder 28 (not shown in the drawing). The second fixed contact holder 27 has a second fixed contact point 271; and the second movable contact holder 28 has a first movable contact point 281. The first movable contact holder 18 and the second movable contact holder 28 are attached to the plunger 14 and both the first movable contact holder 18 and the second movable contact holder 28 move up and down with the plunger 14. In one embodiment, one of the movable contacts 18 and 28 is used by the hot wire, and the other one is for the neutral wire.

When the plunger 14 is in its first (trip) position, the first movable contact point 181 is not in contact with the first fixed contact point 171, and the second movable contact point 281 is not in contact with the first fixed contact point 271. When the plunger 14 is in its second (reset) position, the first movable contact point 181 is in contact with the first fixed contact point 171, and the second movable contact point 281 is in contact with the first fixed contact point 271.

Electronic Structure of a Pulse Activated Magnetic Trip/Reset Mechanism

Figure 3:
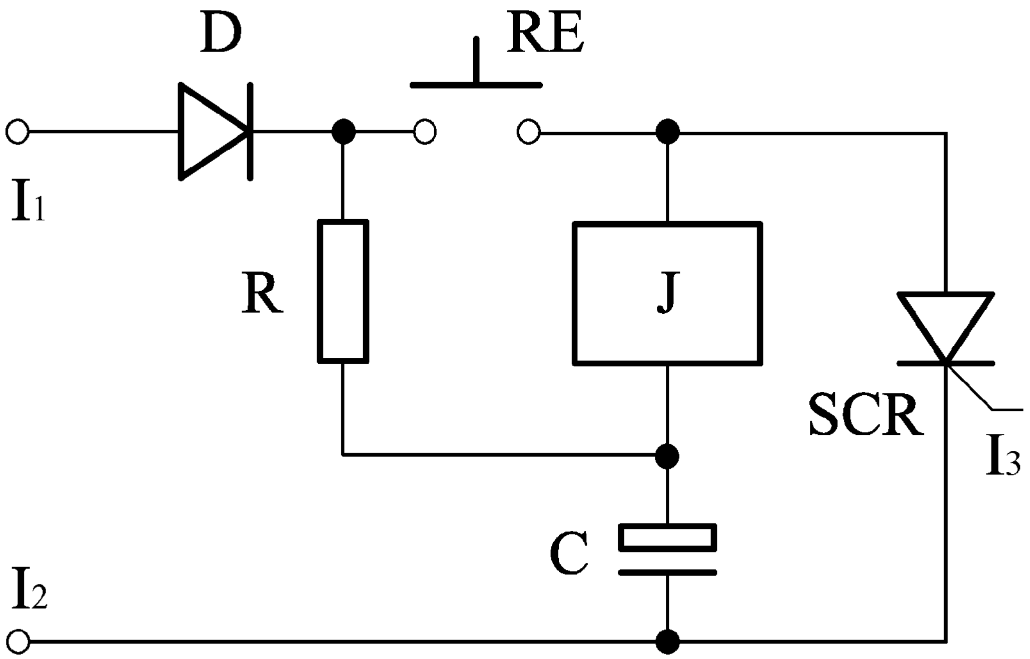
FIG. 3 is an exemplary circuit diagram of a pulse activated magnetic trip/reset mechanism according to one embodiment of the present invention.

In one embodiment, a detailed electronic circuit of a pulse activated magnetic trip/reset mechanism is depicted in the circuit diagram shown in FIG. 3 according to one embodiment of the present invention. The electronic circuit for a pulse activated magnetic trip/reset mechanism of a ground fault circuit interrupter has:

(i) a first input of an alternate current I1;
(ii) a second input of the alternate current I2;
(iii) a diode D having an anode and a cathode;
(iv) a reset switch RE having a first terminal and a second terminal;
(v) a resistor R having a first terminal and a second terminal;

(vi) a trip/reset coil J having a first terminal and a second terminal;

(vii) a capacitor C having a positive terminal and a negative terminal; and (viii) a silicon controlled rectifier SCR having an anode, a cathode and a gate.

The circuit is configured as following:

The anode of the diode D is electrically coupled to the first input of the alternate current $I_1$, and the cathode of the diode D is electrically coupled to the first terminal of the reset switch RE and the first terminal of the resistor R;

The first terminal of the resistor R is electrically coupled to the first terminal of the reset switch RE and the cathode of the diode D, and the second terminal of the resistor R is electrically coupled to the second terminal of the trip/reset coil J and the positive terminal of the capacitor C;

The first terminal of the reset switch RE is electrically coupled to the cathode of the diode D and the first terminal of the resistor R, and the second terminal of the reset switch RE is electrically coupled to the first terminal of the trip/reset coil J and the cathode of the SCR;

The first terminal of the trip/reset coil J is electrically coupled to the second terminal of the reset switch RE and the cathode of the SCR, and the second terminal of the trip/reset coil J is electrically coupled to the second terminal of the resistor R and the positive terminal of the capacitor C;

The positive terminal of the capacitor C is electrically coupled to the second terminal of the resistor R and the second terminal of the trip/reset coil J, and the negative terminal of the capacitor C is electrically coupled to the second input of the alternate current $I_2$, and the cathode of the SCR;

The anode of the SCR is electrically coupled to the second terminal of the reset switch RE and the first terminal of the trip/reset coil J, the cathode of the SCR is electrically coupled to the negative terminal of the capacitor C and the second input of the alternate current $I_2$, and the gate of the SCR is electrically coupled to a control signal from a ground fault detection circuit.

When the ground fault detection circuit provides a positive control signal when a ground fault is detected, the SCR becomes conductive and a series of pulses in a first polarity pass through the first input of the alternate current I1, the diode D, the resistor R, from the second terminal to the first terminal of the trip/reset coil J, the SCR and the second input of the alternate current I2 to cause the trip/reset coil J to move a plunger 14 to a first (trip) position. When the ground fault circuit interrupter is in trip position, both hot input wire and neutral input wire are cut off from an electrical source.

On the other hand, when the ground fault circuit interrupter is in trip condition and the reset switch RE is pressed, a series pulses in a second polarity (opposite to the first polarity) pass through the trip/reset coil J in an opposite direction from the first terminal to the second terminal of the trip/reset coil J, to cause the trip/reset coil J to move the plunger 14 to a second (reset) position. When the ground fault circuit interrupter is in reset position, both hot input wire and neutral input wire are connected to the electrical source and the ground fault circuit interrupter is in normal operating condition.

Figure 4:
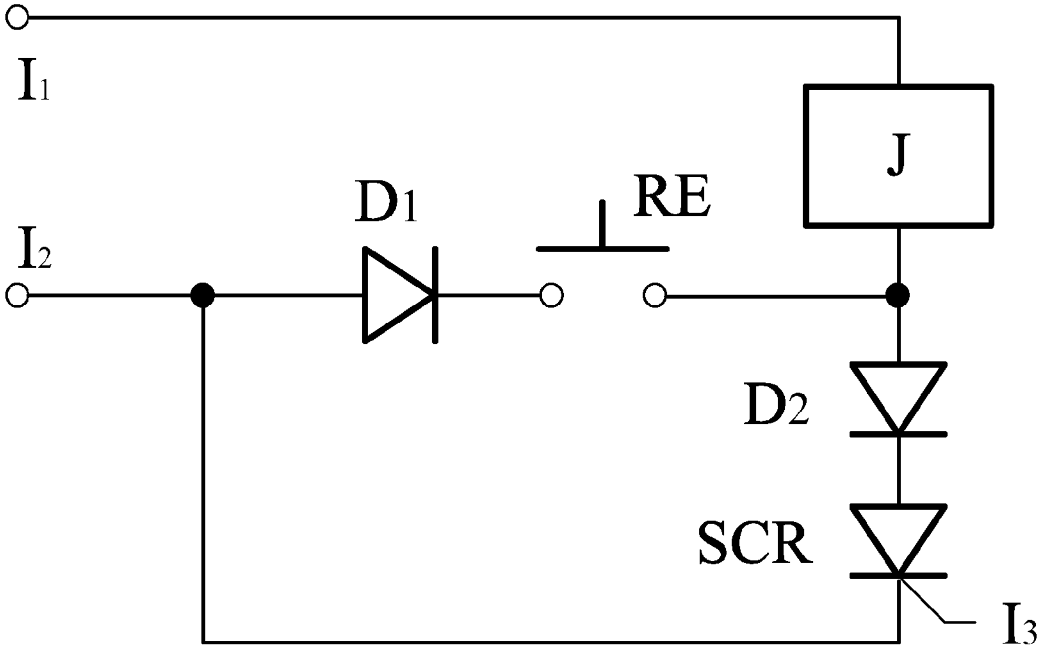
FIG. 4 is another exemplary circuit diagram of a pulse activated magnetic trip/reset mechanism according to one embodiment of the present invention.

In one embodiment, a detailed electronic circuit of a pulse activated magnetic trip/reset mechanism is depicted in the circuit diagram shown in FIG. 4 according to one embodiment of the present invention. The electronic circuit for a pulse activated magnetic trip/reset mechanism of a ground fault circuit interrupter has:

(i) a first input of an alternate current $I_1$;

(ii) a second input of the alternate current $I_2$;

(iii) a first diode $D_1$ having an anode and a cathode;

(iv) a reset switch RE having a first terminal and a second terminal;

(v) a second diode $D_2$ having an anode and a cathode;

(vi) a trip/reset coil J having a first terminal and a second terminal; and (vii) a silicon controlled rectifier SCR having an anode, a cathode and a gate.

The circuit is configured as following:

The anode of the first diode $D_1$ is electrically coupled to the second input of the alternate current $I_2$, and the cathode of first diode $D_1$ is electrically coupled to the first terminal of the reset switch RE;

The first terminal of the reset switch RE is electrically coupled to the cathode of first diode $D_1$, and the second terminal of the reset switch RE is electrically coupled to the anode of the second diode $D_2$ and the second terminal of the trip/reset coil J;

The first terminal of the trip/reset coil J is electrically coupled to the first input of an alternate current $I_1$, and the second terminal of the trip/reset coil J is electrically coupled to the second terminal of the reset switch RE and the anode of the second diode $D_2$;

The anode of the second diode $D_2$ is electrically coupled to the second terminal of the reset switch RE and the second terminal of the trip/reset coil J, and the cathode of second diode $D_2$ is electrically coupled to the anode of the SCR;

The anode of the SCR is electrically coupled to the cathode of cathode of second diode $D_2$, the cathode of the SCR is electrically coupled to the second input of the alternate current $I_2$ and the anode of the first diode $D_1$, and the gate of the SCR is electrically coupled to a control signal from a ground fault detection circuit.

When the ground fault detection circuit provides a positive control signal when a ground fault is detected, the SCR becomes conductive and a series of pulses in a first polarity pass through the first input of the alternate current I1 from the first terminal to the second terminal of the trip/reset coil J, the second diode D2, the SCR and the second input of the alternate current I2 to cause the trip/reset coil J to move a plunger 14 to a first (trip) position. When the ground fault circuit interrupter is in trip position, both hot input wire and neutral input wire are cut off from an electrical source.

On the other hand, when the ground fault circuit interrupter is in trip condition and the reset switch RE is pressed, a series pulses in a second polarity (opposite to the first polarity) pass through the trip/reset coil J in an opposite direction from the second terminal of the trip/reset coil J to the first terminal of the trip/reset coil J, to cause the trip/reset coil J to move the plunger 14 to a second (reset) position. When the ground fault circuit interrupter is in reset position, both hot input wire and neutral input wire are connected to the electrical source and the ground fault circuit interrupter is in normal operating condition.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A pulse activated magnetic trip/reset mechanism for a ground fault circuit interrupter, comprising:

(i) a body having a top surface, an opposite, bottom surface, a cylindrical opening at the center;

(ii) a ferrite core having a concave top surface, and a convex bottom surface, positioned inside of the cylindrical opening at the bottom of the body;

(iii) a plunger having a top surface, a bottom surface and a body portion defined therebetween, the bottom surface having a corresponding convex shape matching the concave top surface of the ferrite core, wherein the plunger is positioned above the ferrite core in the cylindrical opening of the body, and is movable in two positions in reaction to a magnetic field surrounding the plunger: (1) a first position (trip position) where the plunger is in close contact with the ferrite core, and (2) a second position (reset position) where the plunger is away from the ferrite core;

(iv) a ferrite surrounding formed of a single ferrite plate and adapted to surround an outer perimeter of the body to magnetically couple with the ferrite core and the plunger to form a complete magnetic field loop, wherein the body, and the ferrite core and the plunger positioned in the cylindrical opening of the body are received in the ferrite surrounding such that when the plunger is in its first position (trip position), the top surface of the plunger is away from a top end portion of the ferrite surrounding, and when the plunger is in its second position (reset position), the top surface of the plunger is in contact with the top end portion of the ferrite surrounding;

(v) a permanent magnet positioned under the top surface of the body, around and outside of the cylindrical opening of the body;

(vi) a trip/reset coil positioned at the bottom portion of the body and around the cylindrical opening of the body, wherein when a series of pulses in a first polarity pass through the trip/reset coil, the magnetic field generated by the trip/reset coil drives the plunger to the first position, and when a series of pulses in a second polarity that is opposite to the first polarity pass through the trip/reset coil, the magnetic field generated by the trip/reset coil drives the plunger to the second position;

(vii) a reset spring received in the ferrite surrounding and positioned between a plunger block and the top surface of the body to keep the plunger in its reset position;

(viii) a first fixed contact holder having a first fixed contact point; and (ix) a first movable contact holder having a first movable contact point, wherein the first movable contact holder is attached to the body portion of the plunger such that when the plunger is in its first position (trip position), the first movable contact point is not in contact with the first fixed contact point, and when the plunger is in its second position (reset position), the first movable contact point is in contact with the first fixed contact point.

2. The pulse activated magnetic trip/reset mechanism of claim 1, further comprising:

(i) a second fixed contact holder having a second fixed contact point; and (ii) a second movable contact holder having a second movable contact point, wherein the second movable contact holder is attached to the body of the plunger such that when the plunger is in its first position (trip position), the second movable contact point is not in contact with the second fixed contact point, and when the plunger is in its second position (reset position), the second movable contact point is in contact with the second fixed contact point.

3. The pulse activated magnetic trip/reset mechanism of claim 2, wherein the first polarity is positive, and the second polarity is negative.

4. A ground fault circuit interrupter containing the pulse activated magnetic trip/reset mechanism of claim 3.

5. An electronic circuit for a pulse activated magnetic trip/reset mechanism of a ground fault circuit interrupter comprising:

(i) a first input of an alternate current;

(ii) a second input of the alternate current;

(iii) a diode having an anode and a cathode, wherein the anode is electrically coupled to the first input of the alternate current;

(iv) a reset switch having a first terminal and a second terminal;

(v) a resistor having a first terminal and a second terminal, wherein the first terminal is electrically coupled to the first terminal of the reset switch and the cathode of the diode;

(vi) a trip/reset coil having a first terminal and a second terminal, wherein the first terminal of the trip/reset coil is electrically coupled to the second terminal of the reset switch and the second terminal of the trip/reset coil is electrically coupled to the second terminal of the resistor;

(vii) a capacitor having a positive terminal and a negative terminal, wherein the positive terminal of the capacitor is electrically coupled to the second terminal of the resistor and the second terminal of the trip/reset coil, and the negative terminal of the capacitor is electrically coupled to the second input of the alternate current; and (viii) a silicon controlled rectifier having an anode, a cathode and a gate, wherein the anode of the silicon controlled rectifier is electrically coupled to the first terminal of the trip/reset coil and the second terminal of the reset switch, the cathode of the silicon controlled rectifier is electrically coupled to the second input of the alternate current and the negative terminal of the capacitor, and the gate of the silicon controlled rectifier is electrically coupled to a control signal from a ground fault detection circuit, when the ground fault detection circuit provides a positive control signal if a ground fault is detected, the silicon controlled rectifier becomes conductive and a series of pulses in a first polarity pass through the first input of the alternate current, the diode, the resistor, from the second terminal to the first terminal of the trip/reset coil, the silicon controlled rectifier and the second input of the alternate current to cause the trip/reset coil to be in trip position; and when trip/reset coil is in trip position and the reset switch is pressed, a series pulses in a second (opposite to the first) polarity pass through the trip/reset coil in an opposite direction, from the first terminal to the second terminal of the trip/reset coil, to cause the trip/reset coil to be in reset position.

6. A ground fault circuit interrupter containing the electronic circuit for a pulse activated magnetic trip/reset mechanism of claim 5.

7. An electronic circuit for a pulse activated magnetic trip/reset mechanism of a ground fault circuit interrupter comprising:

(i) a first input of an alternate current;

(ii) a second input of the alternate current;

(iii) a first diode having an anode and a cathode, wherein the anode is electrically coupled to the second input of the alternate current;

(iv) a reset switch having a first terminal and a second terminal, wherein the first terminal of the reset switch is electrically coupled to the cathode of the first diode;

(v) a trip/reset coil having a first terminal and a second terminal, wherein the first terminal of the trip/reset coil is electrically coupled to the first terminal of the first input of the alternate current, and the second terminal of the trip/reset coil is electrically coupled to the second terminal of the reset switch;

(vi) a second diode having an anode and a cathode, wherein the anode of the second diode is electrically coupled to the second terminal of the reset switch and the second terminal of the trip/reset coil;

(vii) a silicon controlled rectifier having an anode, a cathode and a gate, wherein the anode of the silicon controlled rectifier is electrically coupled to the cathode of the second diode, the cathode of the silicon controlled rectifier is electrically coupled to the second input of the alternate current, and the gate of the silicon controlled rectifier is electrically coupled to a control signal from a ground fault detection circuit, when the ground fault detection circuit provides a positive control signal when a ground fault is detected, the silicon controlled rectifier becomes conductive and a series of pulses in a first polarity pass through the first input of the alternate current, from the first terminal to the second terminal of the trip/reset coil, the second diode, the silicon controlled rectifier and the second input of the alternate current to cause the trip/reset coil to be in trip position; and when the trip/reset coil is in trip position and the reset switch is pressed, a series pulses in a second (opposite to the first) polarity pass through the trip/reset coil in an opposite direction, from the second terminal to the first terminal of the trip/reset coil, to cause the trip/reset coil to be in reset position.

8. A ground fault circuit interrupter containing the electronic circuit for a pulse activated magnetic trip/reset mechanism of claim 7.

9. The pulse activated magnetic trip/reset mechanism of claim 1, wherein the body further has a central separator formed between the top surface and the bottom surface, wherein the trip/reset coil is wound outside a lower portion of the body between the central separator and the bottom surface of the body in such a way that when the series of pulses in the first polarity pass through the trip/reset coil, the magnetic force of the trip/reset coil pulls the plunger downward to its first position, and when the series of pulses in the second polarity pass through the trip/reset coil, the magnetic force of the trip/reset coil pushes the plunger upward to its second position.

10. The pulse activated magnetic trip/reset mechanism of claim 9, wherein the permanent magnet is positioned around an upper portion of the body between the center separator and the top surface of the body.

* * * * *